(12) United States Patent
Tasumi et al.

(10) Patent No.: US 7,823,964 B2
(45) Date of Patent: Nov. 2, 2010

(54) BOTTOM STRUCTURE OF VEHICLE BODY

(75) Inventors: Shin Tasumi, Toyota (JP); Hiroki Masuda, Kasugai (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/084,320

(22) PCT Filed: Nov. 2, 2006

(86) PCT No.: PCT/IB2006/003083

§ 371 (c)(1),
(2), (4) Date: Apr. 30, 2008

(87) PCT Pub. No.: WO2007/052133

PCT Pub. Date: May 10, 2007

(65) Prior Publication Data

US 2009/0134667 A1 May 28, 2009

(30) Foreign Application Priority Data

Nov. 2, 2005 (JP) .............................. 2005-319792

(51) Int. Cl.
*B62D 25/20* (2006.01)
(52) U.S. Cl. ...................................... 296/204
(58) Field of Classification Search ............ 296/193.07, 296/204, 203.01
See application file for complete search history.

(56) References Cited

U.S. PATENT DOCUMENTS

| 4,892,350 A | 1/1990 | Kijima |
| 5,180,206 A * | 1/1993 | Toyoda ........................ 296/204 |
| 5,567,005 A * | 10/1996 | Kosuge et al. .............. 296/204 |
| 2002/0167200 A1 | 11/2002 | Uchida |

FOREIGN PATENT DOCUMENTS

| CN | 1608922 A | 4/2005 |
| EP | 1 712 454 | 10/2006 |
| JP | 01 095487 U | 6/1989 |
| JP | 02 108672 U | 8/1990 |
| JP | 9-39839 | 2/1997 |
| JP | 11 082008 A | 3/1999 |
| JP | 2005-170076 | 6/2005 |
| JP | 2005 186836 A | 7/2005 |

OTHER PUBLICATIONS

International Search Report.
Written Opinion of the ISR.
Japanese Office Action dated Sep. 12, 2008.
Office Action issued Sep. 18, 2009, in Chinese Appln. No. 200680040514.3. Text Portion.

* cited by examiner

*Primary Examiner*—Dennis H Pedder
(74) *Attorney, Agent, or Firm*—Finnegan, Henderson, Farabow, Garrett & Dunner, LLP

(57) ABSTRACT

A second cross member, which extends in the lateral direction of a vehicle, is provided between one of floor side members and one of tunnel under reinforcements below a front floor panel. The bottom wall of the second cross member is arch-shaped, and a space is provided under the bottom wall. Due to the arch-shaped bottom wall, the second cross member deforms upward upon side collision of the vehicle, whereby the components arranged in the space are not damaged.

10 Claims, 9 Drawing Sheets

BOTTOM STRUCTURE OF VEHICLE BODY

BACKGROUND OF THE INVENTION

1. Field of the Invention

The invention relates to a bottom structure of a vehicle body that is suitable for protection against an impact applied upon side collision of a vehicle.

2. Description of the Related Art

Japanese Patent Application Publication JP-A-09-39839 describes a structure in which a floor cross member having a middle portion that bends and thus has a convex shape is provided below a passenger seat so as to extend in the lateral direction of a vehicle body.

According to this structure, when a vehicle is hit from one side thereof and collision impact is applied to the floor cross member from that side of the vehicle, the convex middle portion of the floor cross member further bends upward and thereby inclines the passenger seat towards the lateral center of the passenger compartment, so as to protect the occupant on the passenger seat.

However, according to this technology, because a floor cross member having a bending portion needs to be additionally provided under the passenger seat, the vehicle weight increases, and the structure under the passenger seats becomes complicated.

Meanwhile, there are demands for minimizing the loss of the space under the floor of a vehicle body, in which, for example, a fuel tank is installed.

SUMMARY OF THE INVENTION

In view of the above, the invention provides a bottom structure of a vehicle body in which a space is provided under a vehicle body floor and which enables components, etc. arranged in the space to be effectively protected upon collision of the vehicle.

A bottom structure of a vehicle body according to the invention includes a vehicle body floor that constitutes an undersurface of a vehicle compartment floor, a plurality of vehicle frame members that are provided below the vehicle body floor and extend along a longitudinal direction of a vehicle, and a cross member via which the vehicle frame members are connected with each other in a lateral direction of the vehicle. The cross member includes a bottom wall that curves towards to upper side of the vehicle and is not in contact with an undersurface of the vehicle body floor; a pair of sidewalls that extend from edges of the bottom wall which run in the lateral direction of the vehicle, respectively; and a pair of flanges that extend from edges of the side walls which run in the lateral direction of the vehicle, respectively. The flanges are joined to the undersurface of the vehicle body floor. The cross member is joined to the vehicle frame members. A closed cross-sectional area, which is closed as viewed from the front of the vehicle, is defined between the cross member, the vehicle body floor, and the vehicle frame members.

According to this structure, a plurality of the vehicle frame members extending along the longitudinal direction of the vehicle are provided under the vehicle body floor that constitutes the undersurface of the vehicle compartment floor. The cross member including the bottom wall, a pair of the sidewalls, and a pair of the flanges connects the vehicle frame members in the lateral direction of the vehicle.

Further, in the aforementioned structure, since the bottom wall of the cross member curves upward, the capacity of the space under the bottom wall of the cross member is larger than when the bottom wall is flat, which enables a more effective use of the space (underfloor installation space) for accommodating components, etc.

In addition, since the bottom wall of the cross member curves towards the upper side of the vehicle, the cross member deforms to be upwardly convex upon side collision of the vehicle, so that the components arranged in the space under the cross member (underfloor installation space) are not damaged.

Further, since the closed cross-sectional area is defined between the cross member, the vehicle body floor, and the vehicle frame members, a desired capacity for transmitting load upon side collision of the vehicle is ensured.

In the aforementioned structure, a portion of the vehicle body floor that corresponds to an area where the cross member is provided may protrude towards the upper side of the vehicle.

According to this structure, the cross-sectional area of the cross member increases.

In the aforementioned structure, a flange may be provided at an end of the bottom wall of the cross member in the lateral of the vehicle, and it may be joined to the bottom face of one of the vehicle frame members that is arranged outermost in the lateral direction of the vehicle. According to this structure, impact load can be effectively transmitted and absorbed upon side collision of the vehicle.

Also, according to the above-described structure, particularly when the vehicle is hit by a tall vehicle from the side, the vehicle frame member is urged to rotate about its axis towards the vehicle compartment. For example, upon side collision of the vehicle, the vehicle frame member that is arranged outermost in the right side of the vehicle body, as viewed from the rear of the vehicle, is urged to rotate counterclockwise about its axis. At this time, the rotational force acting on the outermost member is received by the flange, which is provided at the end of the bottom wall of the cross member in the lateral direction of the vehicle, as a force acting in the shear direction. Thus, the rotational deformation of the vehicle frame member can be effectively suppressed.

Further, in the aforementioned structure, the vehicle frame members may include a first member that is arranged outermost in the lateral direction of the vehicle and is joined to the cross member and a second member that is arranged on the inner side of the first member in the lateral direction of the vehicle and is joined to the first member.

Furthermore, in the aforementioned structure, the second member may be joined to an outer end of the cross member in the lateral direction of the vehicle.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE PREFERRED EMBODIMENTS

In the following description, the invention will be described in more detail in terms of exemplary embodiments.

A bottom structure of a vehicle body according to an exemplary embodiment of the invention will be described with reference to FIGS. 1 to 9.

In the drawings, the arrow FR points to the front of the vehicle, the arrow UP to the upper side of the vehicle, the arrow IN to the inside of the vehicle in its lateral direction, and the arrow OUT to the outside of the vehicle in its lateral direction.

Figure 5:
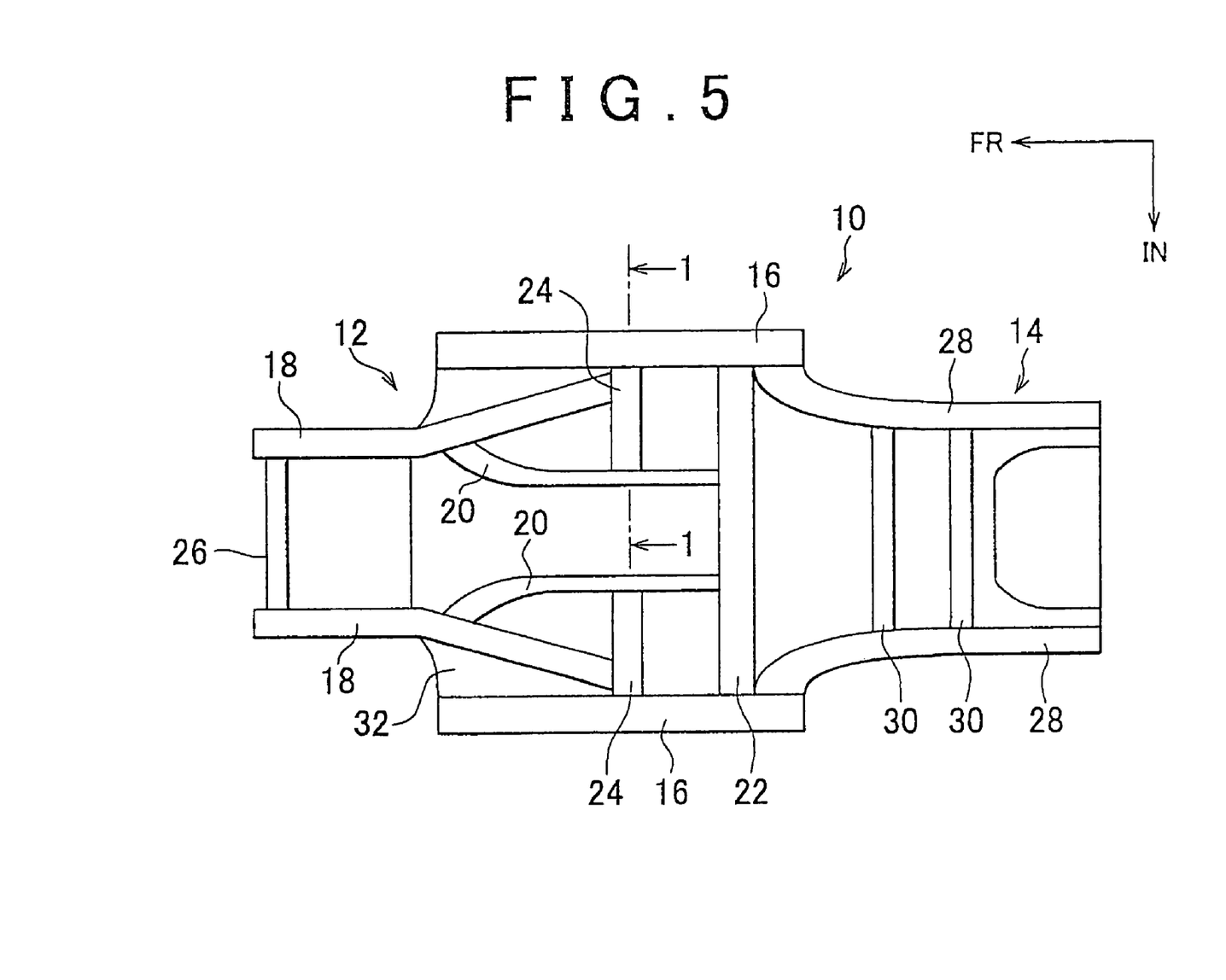
FIG. 5 is a plan view showing the configuration of the bottom frames of the vehicle body.

FIG. 5 is a plan view showing the frame configuration of the bottom structure according to the exemplary embodiment. Referring to FIG. 5, a bottom frame 10 has a front floor section 12 and a rear underbody section 14. In the front floor section 12, six vehicle frame members are arranged so as to extend in the longitudinal direction of the vehicle. Upon frontal collision of the vehicle, these vehicle frame members transmit the load, which has been longitudinally applied to the vehicle, from the front to the rear of the vehicle.

Left and right front side members 16 are arranged at the sides of the front floor section 12, respectively so as to extend in the longitudinal direction of the vehicle, and left and right front side members 18 are arranged on the inner sides of the floor side members 16. Each of the front side members 18 bends such that it extends along the longitudinal direction of the vehicle in the front side and diagonally towards the outside of the vehicle in the rear side. On the inner sides of the front side members 18 are provided left and right tunnel under-reinforcements 20, each of which curves towards the outside of the vehicle such that its curvature increases towards the front of the vehicle.

The front end of each tunnel under reinforcement 20 is welded to the inner face of a middle portion of the corresponding front side member 16, and the rear end of each tunnel under reinforcement 20 is welded to the front face of a third cross member 22 which extends between the rear end portions of the left and right floor side members 16 in the lateral direction of the vehicle. Two second cross members 24 are arranged in line along the lateral direction of the vehicle between the longitudinal center portions of the floor side members 16, and the rear end of each front side member 18 is welded to the front face of the corresponding second cross member 24. The outer ends of the second cross members 24 are welded to the respective inner faces of the floor side members 16, as will be described in detail later, and the inner ends of the second cross members 24 are welded to the respective outer faces of the tunnel under reinforcements 20.

A first cross member 26 extends in the lateral direction of the vehicle between the front end portions of the left and right front side members 18.

In the rear underbody section 14, left and right rear underside members 28 extend in the longitudinal direction of the vehicle. The end portion of each rear underside member 28 curves toward the outside of the vehicle and is welded to the inner face of the rear end portion of the corresponding floor side member 16. A plurality of rear cross members 30 is arranged between the rear underside members 28 so as to extend in the lateral direction of the vehicle.

Hereinafter, description will be made of the main portion of this exemplary embodiment and its periphery.

Figure 1:
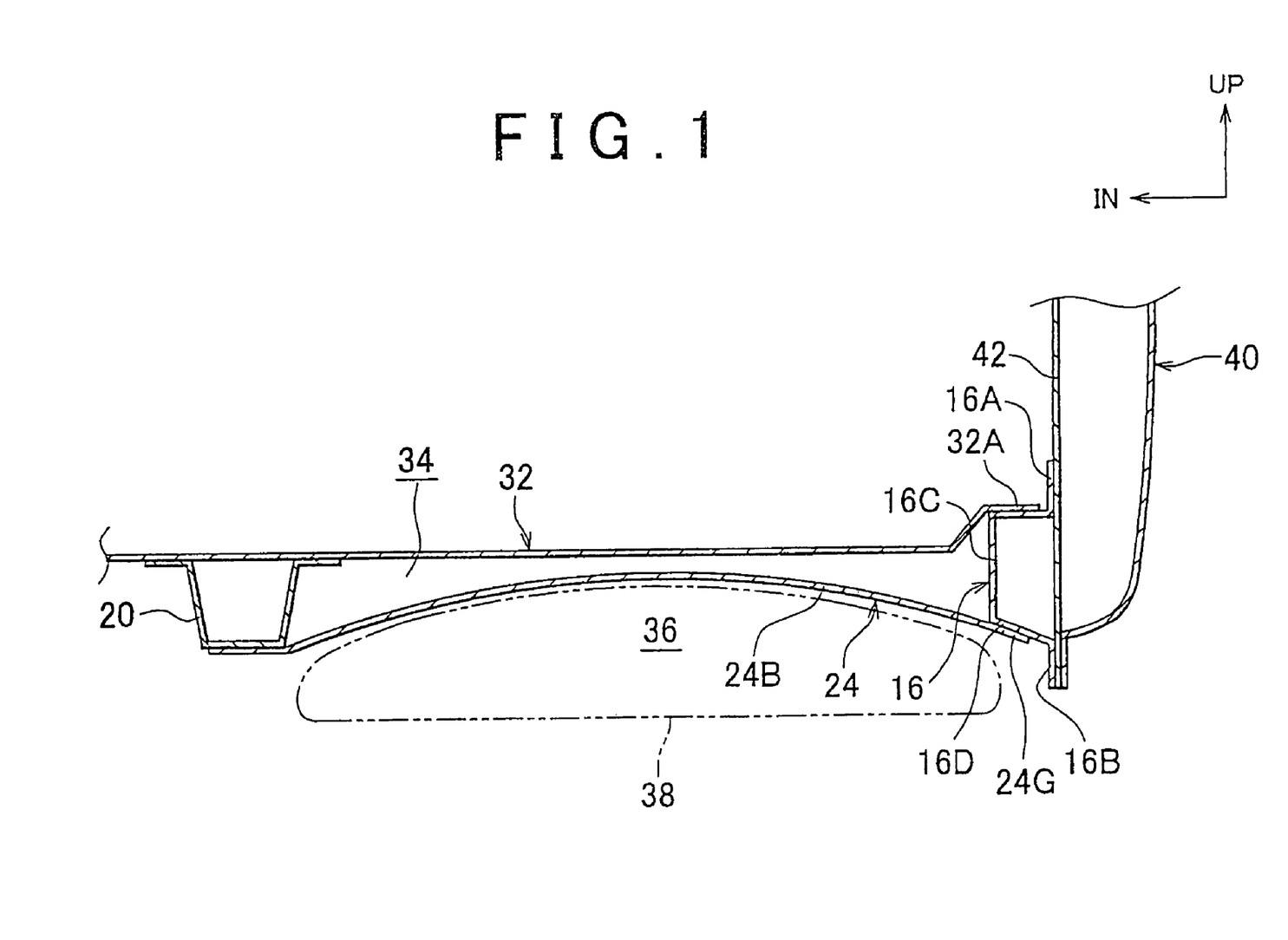
FIG. 1 is an enlarged cross-sectional view showing the main portion of a bottom structure of a vehicle body according to the exemplary embodiment, which is taken along line 1-1 in FIGS. 3 and 5.
Figure 3:
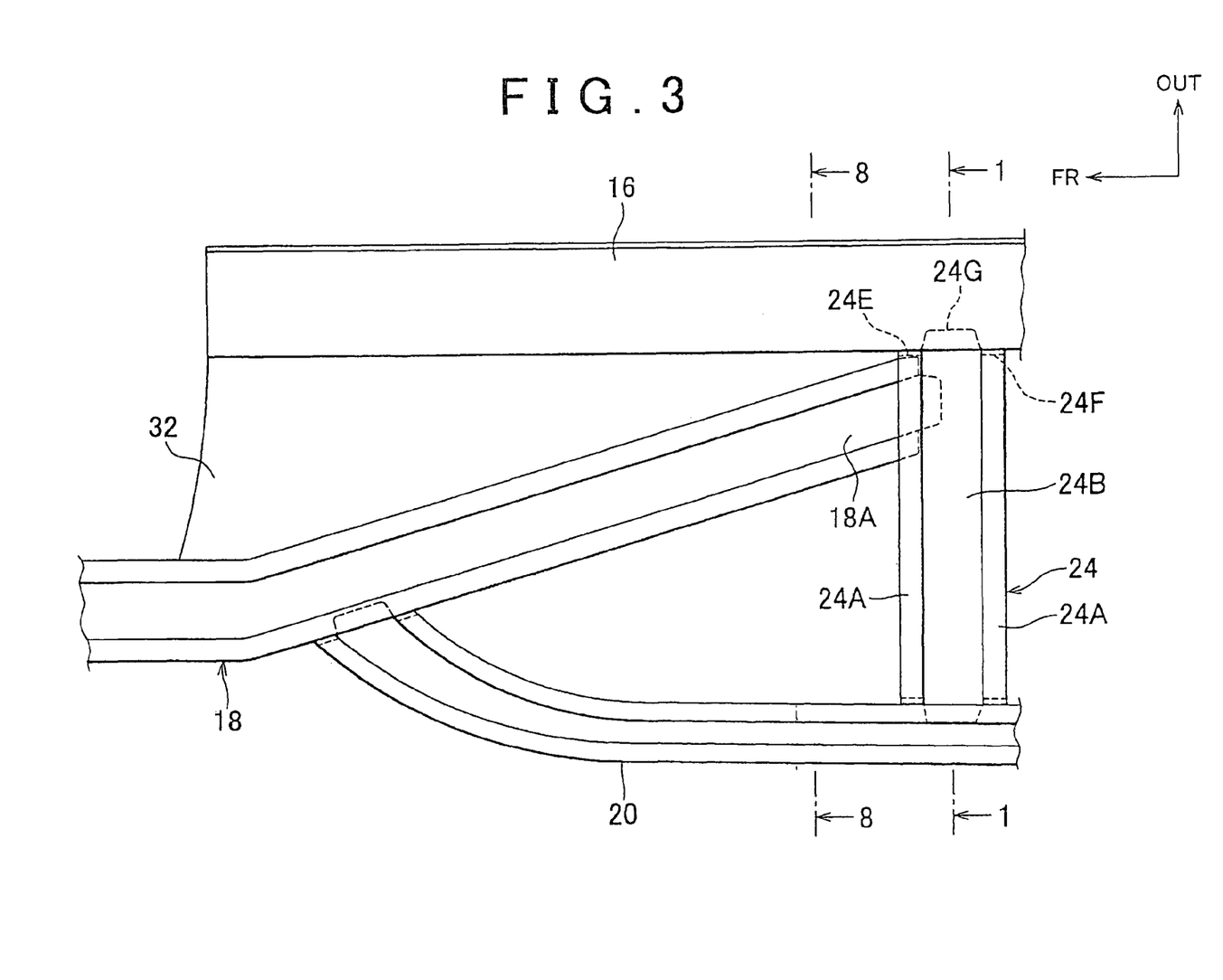
FIG. 3 is a plan view showing the structure of the main portion of the exemplary embodiment shown in FIG. 1.

FIG. 3 is an enlarged plan view showing the structure around the second cross member 24 of the bottom frame 10, and FIG. 1 is a view showing the cross section of where the second cross members 24 are provided, which is taken in the lateral direction of the vehicle.

Figure 4:
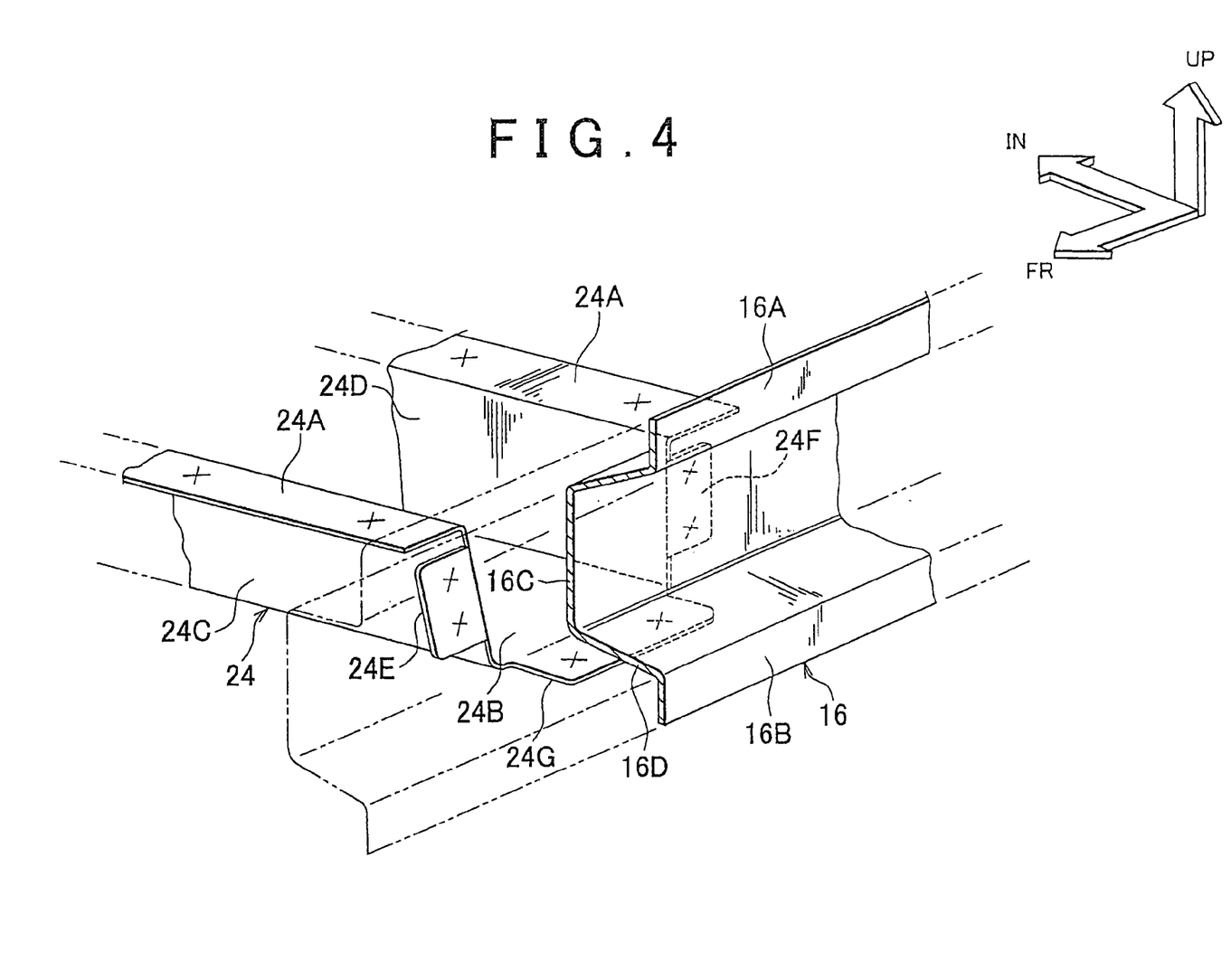
FIG. 4 is an enlarged perspective view showing the structure of the joint between the second cross member and the floor side member.

As shown in FIGS. 1 and 3, each second cross member 24 connects the floor side member 16 and the tunnel under reinforcement 20 on each side. The second cross members 24 are formed as shown in FIG. 4. Note that, in the invention, the shape of each second cross member 24 in its cross section taken in the longitudinal direction of the vehicle and cross-sectional shapes similar thereto will be termed a "hat-like shape". Referring to FIG. 4, each second cross member 24 is arranged such that its opening faces upward. Front and rear flanges 24A of each second cross member 24 are welded to the bottom face of a front floor panel 32, so that a closed cross-sectional area 34, which is closed as viewed in the lateral direction of the vehicle, is formed between the front floor panel 32 and each second cross member 24. Note that the flanges 24A correspond to "a pair of flanges" in the invention.

A bottom wall 24B of each second cross members 24 is arch-shaped so as to be upwardly convex as viewed from the front of the vehicle, which is a characterizing feature of this exemplary embodiment. According to this structure, owing to the arch-shape of the bottom wall 24B, the capacity of a space 36 under the bottom wall 24B of the second cross member 24 is large as compared to when the bottom wall 24B is flat. In the exemplary embodiment, underfloor components 38, such as a fuel tank and a muffler, are arranged in the space 36.

Note that the bottom wall 24B of the second cross member 24 is not in contact with the front floor panel 32. Referring to FIG. 4, flanges 24E, 24F are formed at the ends of a front wall 24C and a rear wall 24D of each second cross member 24. Note that the front wall 24C and the rear wall 24D correspond to "a pair of sidewalls" in the invention. Further, a flange 24G is formed at the outer end of the bottom wall 24B. The flanges 24E, 24F of the front and rear walls 24C, 24D are welded to a vertical wall 16C of the floor side member 16 that also has a hat-like shape in its cross section. The flange 24G of the bottom wall 24B is welded to a lower wall 16D of the floor side member 16.

Referring to FIG. 1, the upper and lower flanges 16A, 16B of the floor side member 16 are welded to a pillar inner panel 42 of a center pillar 40. An end portion 32A of the front floor panel 32, which is one end portion of the front floor panel 32 in its lateral direction, is welded to the upper face of the floor side member 16. The longitudinal end portion of the bottom wall 24B on the inner side of the vehicle is welded to the bottom face of the tunnel under reinforcement 20.

As shown in FIG. 3, a rear end 18A of the front side member 18 is welded to a portion of the second cross member 24 that is close to its outer end. That is, the rear end 18A is welded to a position on the inner side of the floor side member 16, as viewed in the lateral direction of the vehicle.

The effects and advantages of the exemplary embodiment will next be described.

As shown in FIG. 1, in the bottom structure of the vehicle body according to the exemplary embodiment, the second cross member 24 extends in the lateral direction of the vehicle so as to connect the floor side member 16 and the tunnel under reinforcement 20 under the front floor panel 32, and the second cross member 24 (the bottom wall 24B) is arch-shaped so as to be upwardly convex as viewed from the front of the vehicle. According to this structure, the space 36 is provided under the bottom wall 24B of the second cross member 24. As such, the space 36 (underfloor installation space) can be effectively used for accommodating the underfloor components 38, which include a fuel tank and a muffler, for example.

In recent years, utility-oriented vehicles, such as those having three rows of seats, have been increasingly introduced. In such a vehicle, for example, a space for accommodating retracted seats needs to be provided in the rear underbody of the vehicle, and securing such a space requires that underfloor components (e.g., fuel tank, muffler), which are normally arranged in the lower space of the rear underbody, be arranged below the front floor panel. In view of this, the structure according to the exemplary embodiment can be effectively employed in such utility-oriented vehicles.

Figure 2:
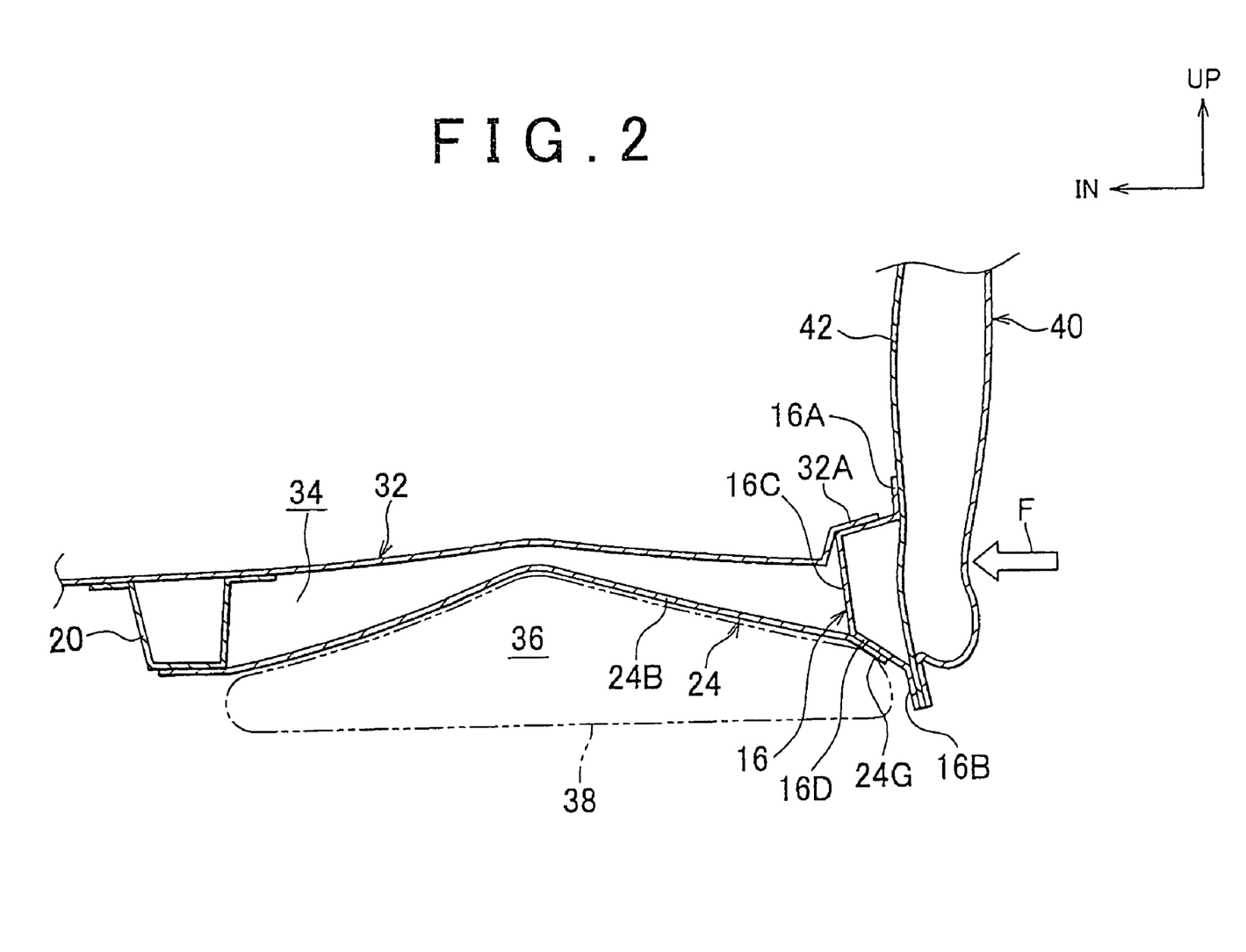
FIG. 2 is a cross-sectional view for illustrating a mode of deformation which occurs upon side collision of the vehicle incorporating the bottom structure shown in FIG. 1.

In addition, since the bottom wall 24B of the second cross member 24 is arch-shaped so as to be upwardly convex as viewed from the front of the vehicle, the second cross member 24 deforms upward upon side collision of the vehicle. That is, as shown in FIG. 2, when an impact load F is applied to the side portion of the vehicle body (i.e., the center pillar 40) from the side of the vehicle, the impact load F acts as an axial force on the second cross member 24 through the floor side member 16. As a result, the second cross member 24 deforms upward at its longitudinal center and becomes more convex towards the upper side. As a result, the underfloor components 38 arranged below the bottom wall 24B of the second cross member 24 (arranged in the underfloor installation space) are not damaged.

As the second cross member 24 deforms as described above, the upward load is transmitted also to the front floor panel 32 though the front wall 24C and the rear wall 24D of the second cross member 24, so that the front floor panel 32 deforms upward to the extent corresponding to the magnitude of the load imposed thereto.

According to the vehicle body bottom structure of the exemplary embodiment, as described above, the space 36 is provided under the front floor panel 32. Further, the deformation mode of the front floor panel 32 is controlled such that, upon side collision of the vehicle, the front floor panel 32 deforms to be more convex upward and thus does not damage the underfloor components 38 arranged in the space 36.

Further, according to the vehicle body bottom structure of the exemplary embodiment, the flange 24G is provided at the outer end portion of the bottom wall 24B of the second cross member 24 and is welded to the bottom face of the floor side member 16. According to this structure, for example, when the vehicle is hit by a tall vehicle (e.g. a sport-utility vehicle (SUV)) from one side and the floor side member 16 is then urged to rotate about its axis, the flange 24G receives the rotational force acting on the floor side member 16 as a force acting in the shear direction.

Figure 6:
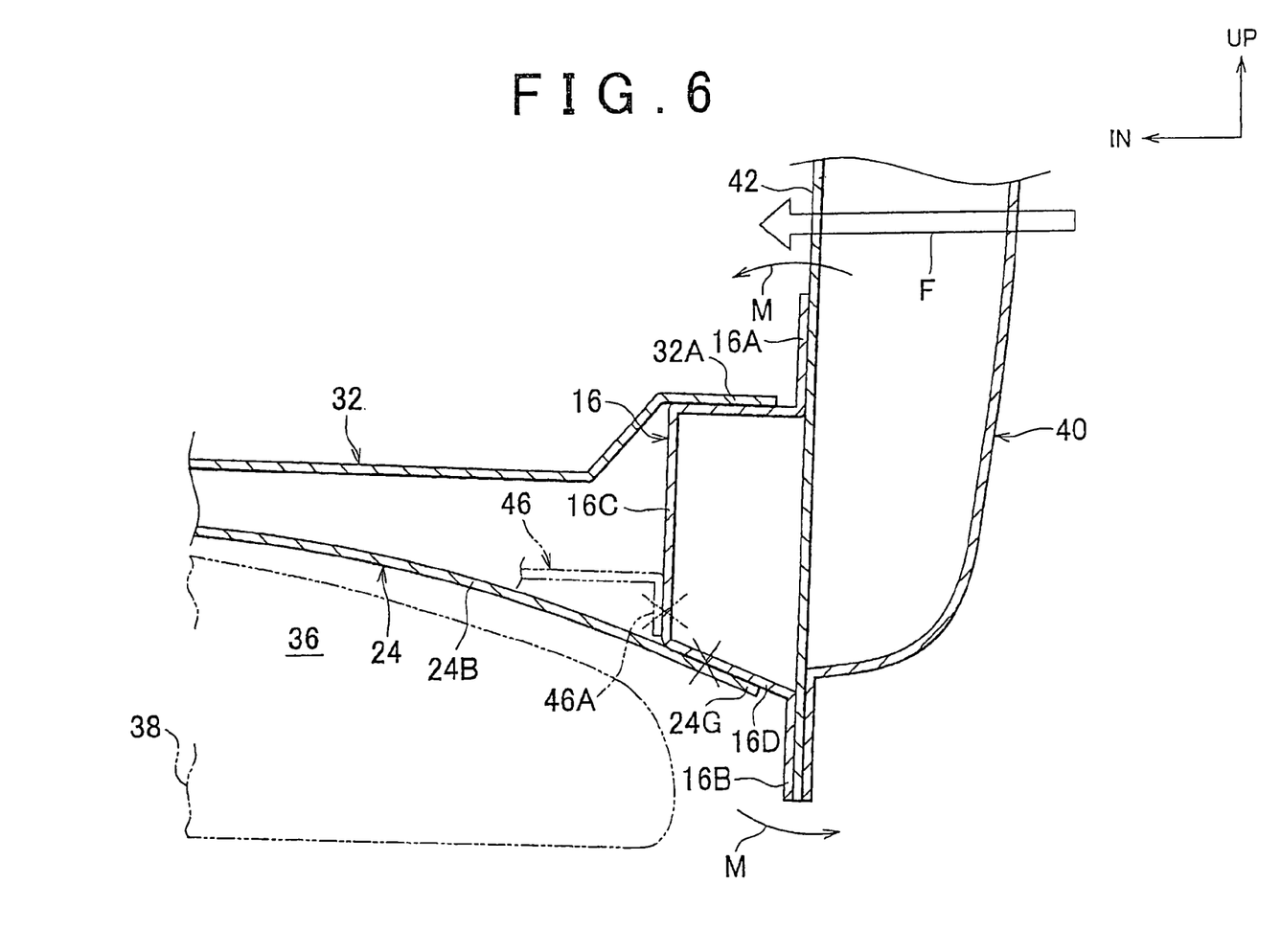
FIG. 6 is an enlarged cross-sectional view showing the main portion of the bottom structure of the vehicle body for illustrating an advantage of the exemplary embodiment.

More specifically, referring to FIG. 6, when the impact load F is applied to the lower portion of the center pillar 40 from the right side of the vehicle, the lower portion of the center pillar 40 deforms as if it falls down into the vehicle compartment. At this time, the floor side member 16, which extends in the longitudinal direction of the vehicle and on the inner side of the lower end portion of the center pillar 40, is urged to rotate counterclockwise (the direction indicated by the arrow M in the drawing) about its axis. Now, reference is made to the case of a second cross member 46 having a flat bottom wall indicated by the dotted line in FIG. 6. In this case, a flange 46A bends downward from the outer end of the second cross member 46 and is welded to the vertical wall 16C of the floor side member 16. In this structure, the flange 46A receives the aforementioned rotational force acting on the floor side member 16 as a force acting in a direction to separate the flange 46A and the vertical wall 16C of the floor side member 16 from each other, and therefore the rotational deformation of the floor side member 16 can not be sufficiently suppressed. In contrast, according to the exemplary embodiment of the invention, since the bottom wall 24B of the second cross member 24 is arch-shaped and the flange 24G is welded to the bottom face of the floor cross member 16, the flange 24G receives the rotational force acting on the floor side member 16 as a force acting in the shear direction. Thus, the rotational deformation of the floor side member 16 can be effectively suppressed, especially when the vehicle is hit by a tall vehicle from the side.

According to the vehicle body bottom structure according to the exemplary embodiment, other advantages can also be achieved as described below.

Figure 7:
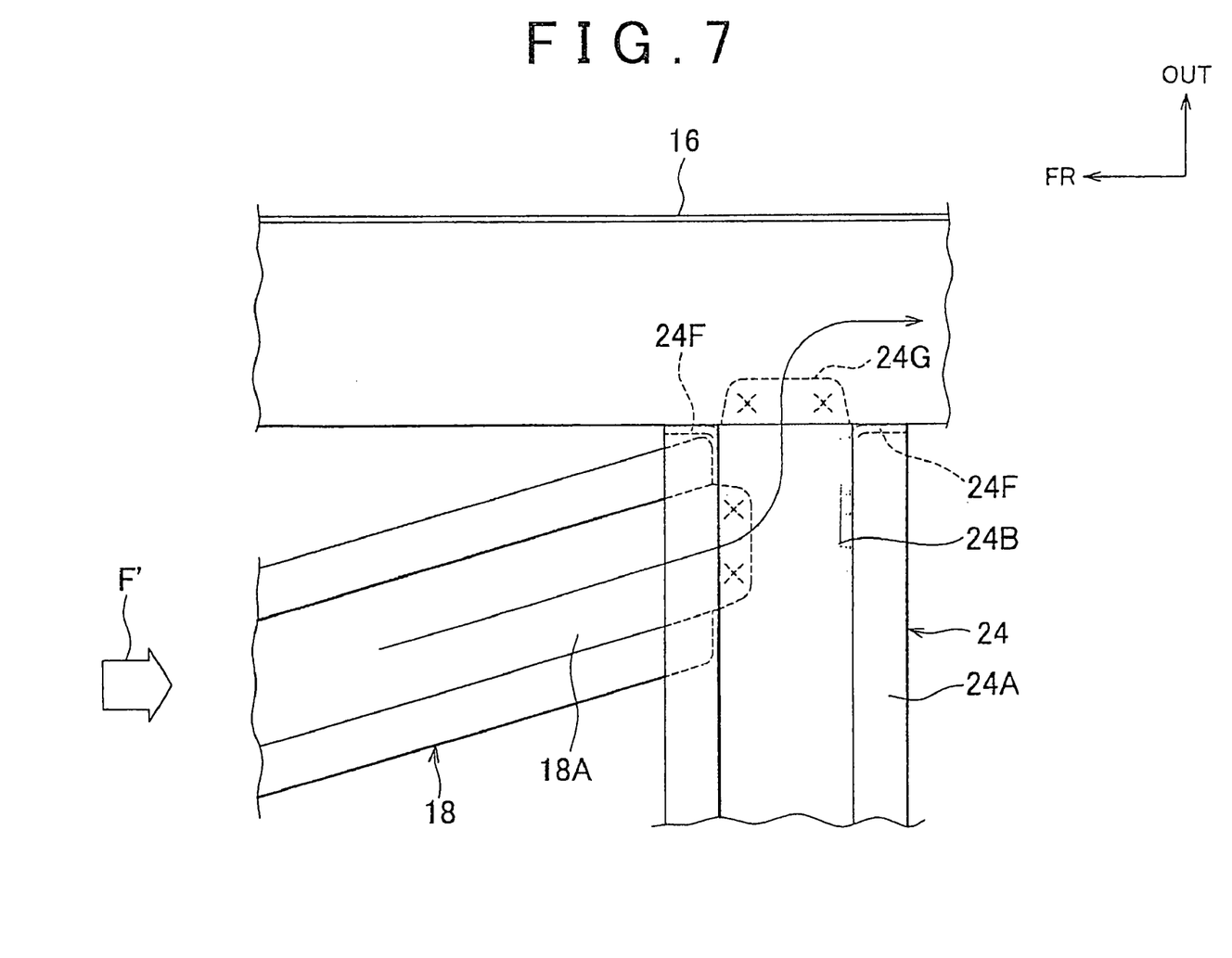
FIG. 7 is an enlarged cross-sectional view showing the main portion of the bottom structure of the vehicle body for illustrating another advantage of the exemplary embodiment.

Firstly, because the rear end portion 18A of the front side member 18 extends diagonally towards the outside of the vehicle in its lateral direction and is welded to the outer end portion of the second cross member 24 as shown in FIG. 7, an impact load F' can be smoothly transmitted to the floor side member 16 upon side collision of the vehicle, and the structure or form of the joint between the members can be simplified. For example, in the case where only the efficient transmission of the impact load F' to the floor side member 16 upon side collision of the vehicle is aimed, the rear end of the front side member may be directly welded to the floor side member 16, rather than to the second cross member 24. In this case, however, the joint portion of the front side member which is joined to the floor side member 16 (i.e., the rear end of the front side member 18) needs to be formed into a complicated shape, which significantly reduces the production efficiency. Further, when the front side member 18 is welded to a portion of the second cross member 24 that is further to the inner side of the vehicle than that shown in FIG. 7, the path through which the impact load F' is transmitted to the floor side member 16 though the second cross member 24 upon frontal collision of the vehicle is relatively long, making it difficult for the impact load to be smoothly transmitted to the floor side member 16. Thus, according to the exemplary embodiment in which the rear and 18A of the front side member 18 is arranged as close as possible to the outside of the vehicle, as viewed in its lateral direction, and is welded to the second cross member 24, a desired capacity for transmitting load upon frontal collision of the vehicle can be ensured, and the productivity can improved. Note that the floor side members 16 correspond to "vehicle frame members" and "first member" in the invention, the front side members 18 correspond to "vehicle frame members" and "second member" in the invention, the tunnel under reinforcements 20 correspond to "vehicle frame members" in the invention, and the front floor panels 32, 50 correspond to "vehicle body floor" in the invention.

Figure 8:
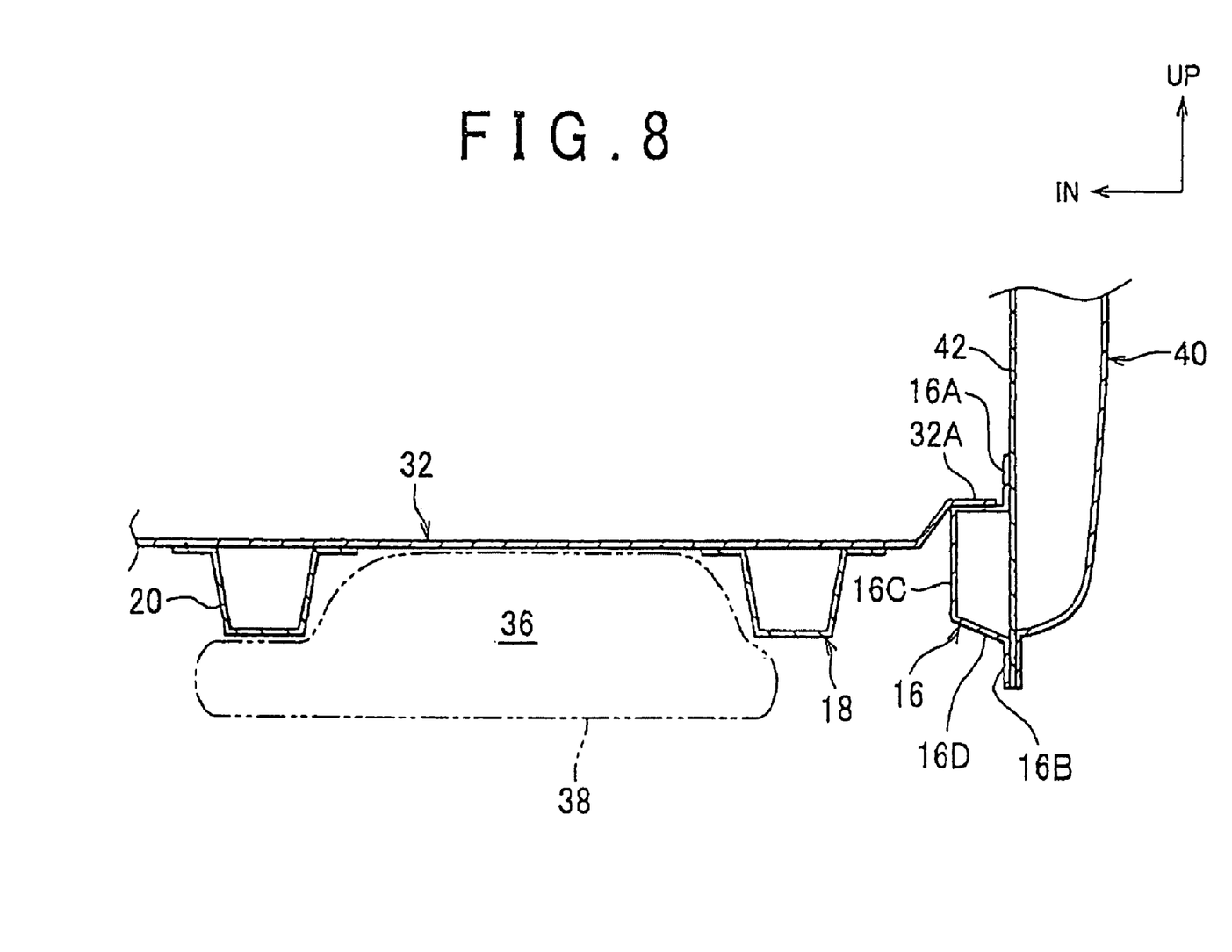
FIG. 8 is a cross-sectional view taken along line 8-8 in FIG. 3 for illustrating another advantage of the exemplary embodiment.
Figure 9:
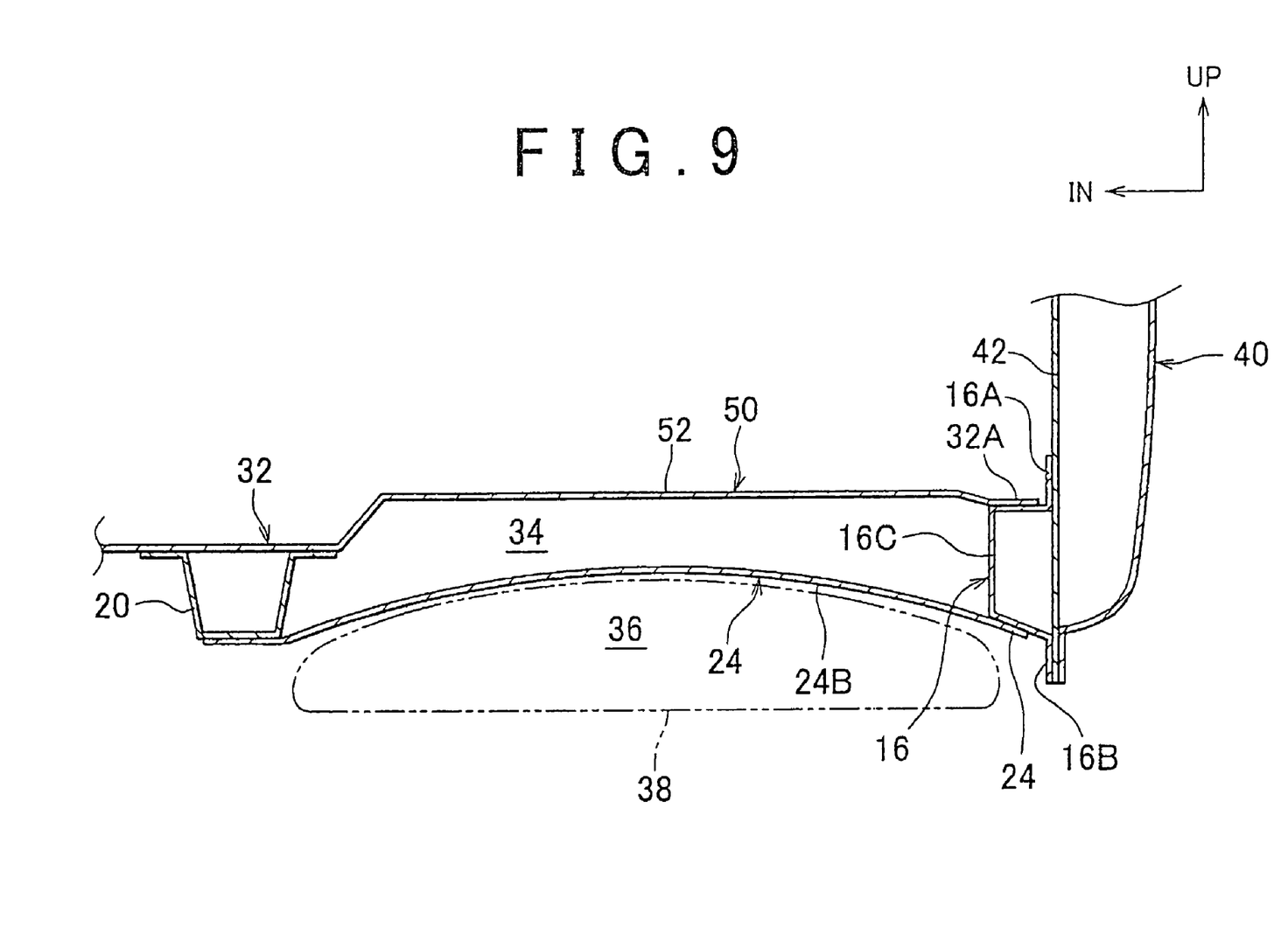
FIG. 9 is a cross-sectional view showing other exemplary embodiment.

Secondly, in the vehicle body bottom structure according to the exemplary embodiment, the rear end portion 18A of the front side member 18 extends diagonally towards the outside of the vehicle and is welded to the longitudinal end of the second cross member 24 on the outer side of the vehicle, so that a certain distance is provided between the front side member 18 and the tunnel under reinforcement 20 in the lateral direction of the vehicle. Accordingly, the capacity of the underfloor space 36 is sufficient, as shown in FIG. 8.

Thirdly, in the bottom structure of the vehicle body according to the exemplary embodiment, the bottom wall 24B of the second cross member 24 is arch-shaped as shown in FIG. 6, the cross-sectional area of the second cross member 24 is larger than when the second cross member 46 has a flat bottom wall (as shown by the two-dotted lines in FIG. 6). Thus, according to the exemplary embodiment, the capacity for transmitting the load F, which has been applied to the side of the vehicle, from one side to the other side of the second cross member 24 increases, and the buckling strength of the second cross member 24 increases.

In the foregoing exemplary embodiment, the front floor panel 32 is smooth and flat. However, the invention is not limited to this. For example, referring to FIG. 9, a front floor panel 50 may alternatively be used, which includes a convex portion 52 that protrudes upward at a position where the second cross member 24 is arranged. In this case, the cross-sectional area of the second cross member 24 is substantially larger, and therefore, the load applied upon side collision can be more effectively transmitted and absorbed, as in the case of the third advantage mentioned above.

Further, in the foregoing exemplary embodiment, the second cross member 24 is arc-shaped to form an arc with a certain curvature and thus is arch-shaped. However, the invention is not limited to this. That is, the invention may include any cross member that is formed upwardly convex so as to achieve effects and advantages that are the same as or similar to those presented above. For example, the invention may include a cross member having a bottom wall including a plurality of arc-shaped portions arranged into an arch shape, or a cross member having a plurality of flat portions arranged into an arch shape.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A bottom structure of a vehicle body, comprising:
a vehicle body floor that constitutes an undersurface of a vehicle compartment floor;
a plurality of vehicle frame members provided below the vehicle body floor and extending along a longitudinal direction of a vehicle, the plurality of vehicle frame members including:
a pair of outer frame members arranged outside of a pair of inner frame members in a lateral direction of the vehicle, the pair of inner frame members bending outwardly toward the outer frame members in a forward direction of the vehicle;
a pair of cross members extending in a lateral direction of the vehicle, each of the pair of cross members including:
a bottom wall that curves upwardly substantially from a respective one of the outer frame members and towards the upper side of the vehicle in a cross-member middle portion and that is not in contact with an undersurface of the vehicle body floor panel; a pair of sidewalls that extend from edges of the bottom wall which run in the lateral direction of the vehicle, respectively; and a pair of flanges that extend from edges of the side walls which run in the lateral direction of the vehicle, respectively, the flanges being joined to the undersurface of the vehicle body floor panel, wherein:
each of the pair of cross members is joined to a respective one of the pair of outer frame members and a respective one of the pair of inner frame members; and
a closed cross-sectional area, which is closed as viewed from the front of the vehicle, is defined between each of the pair of cross members, the vehicle body floor panel, the pair of inner frame members, and the pair of outer frame members.

2. The vehicle bottom structure according to claim 1, wherein
a portion of the vehicle body floor panel that corresponds to an area where the pair of cross members are provided protrudes towards the upper side of the vehicle.

3. The vehicle bottom structure according to claim 1, wherein
a flange is provided at an end of the bottom wall of the pair of cross members in the lateral direction of the vehicle, and is joined to a bottom face of one of the pair of outer frame members.

4. The vehicle bottom structure according to claim 1, wherein
the vehicle frame members further include a pair of rear inner frame members arranged inside of the outer frame members in the lateral direction of the vehicle and joined to the pair of outer frame members, the pair of rear inner frame members bending outwardly toward the outer frame members in a forward direction of the vehicle.

5. The vehicle bottom structure according to claim 4, wherein
the pair of rear inner frame members are joined to at least one rear cross member in the lateral direction of the vehicle.

6. The vehicle bottom structure according to claim 2, wherein
a flange is provided at an end of the bottom wall of the pair of cross members in the lateral direction of the vehicle, and is joined to a bottom face of one of the pair of outer frame members.

7. The vehicle bottom structure according to claim 2, wherein
the vehicle frame members further include a a pair of rear inner frame members arranged inside of the outer frame members in the lateral direction of the vehicle and joined to the pair of outer frame members, the pair of rear inner frame members bending outwardly toward the outer frame members in a forward direction of the vehicle.

8. The vehicle bottom structure according to claim 3, wherein
the vehicle frame members further include a pair of rear inner frame members arranged inside of the outer frame members in the lateral direction of the vehicle and joined to the pair of outer frame members, the pair of rear inner frame members bending outwardly toward the outer frame members in a forward direction of the vehicle.

9. The vehicle bottom structure according to claim 7, wherein the pair of rear inner frame members are joined to at least one rear cross member in the lateral direction of the vehicle.

10. The vehicle bottom structure according to claim 8, wherein the pair of rear inner frame members are joined to at least one rear cross member in the lateral direction of the vehicle.

* * * * *